United States Patent [19]

Jagtap

[11] 4,405,759
[45] Sep. 20, 1983

[54] PROCESS FOR HALOGENATION OF BUTADIENE POLYMER IN THE PRESENCE OF ALUMINUM-CONTAINING MATERIAL

[75] Inventor: Asvinkumar N. Jagtap, Corpus Christi, Tex.

[73] Assignee: PPG Industries, Inc., Pittsburgh, Pa.

[21] Appl. No.: 365,438

[22] Filed: Apr. 5, 1982

[51] Int. Cl.$^3$ .............................................. C08F 8/22
[52] U.S. Cl. ................................ 525/356; 525/359.1; 525/332.3
[58] Field of Search ............................. 525/356, 359.1

[56] References Cited

U.S. PATENT DOCUMENTS

| | | | |
|---|---|---|---|
| 2,581,927 | 1/1952 | Briant | 525/356 |
| 2,955,103 | 10/1960 | Baldwin et al. | 525/356 |
| 2,980,656 | 4/1961 | Jones et al. | 260/85.1 |
| 3,081,284 | 3/1963 | Serniuk et al. | 525/356 |
| 3,092,612 | 6/1963 | Makowski | 525/356 |
| 3,293,226 | 12/1966 | De Schrijver | 260/85.1 |
| 3,392,161 | 7/1968 | Uelzmann | 260/94.7 |
| 3,798,291 | 3/1974 | Dall'Asta et al. | 260/931 |

OTHER PUBLICATIONS

S. Crawley and I. C. McNeill, "Preparation and Degradation of Head-To-Head PVC", *Journal of Polymer Science*, vol. 16, pp. 2593–2606 (1978).
N. Murayama and Y. Amagi, "On Head-To-Head Poly(Vinyl Chloride) and Poly(Vinylidene Chloride)", *Polymer Letters*, vol. 4, pp. 119–125 (1966).
G. D. Coates, M. L. H. Green and K. Wade, *Organometallic Compounds*, 3d Ed., vol. I, pp. 299–305 and 337–339 (1967).
F. A. Cotton and G. Wilkinson, *Advanced Inorganic Chemistry*, 3d Ed., pp. 264–265 (1972).
B. Ivan et al, "Determination of Labile Chlorine Content in Polychloroprene ...", *Journal of Polymer Bulletins*, vol. 2, No. 7, Berlin, pp. 461–467 (1980).

*Primary Examiner*—Joseph L. Schofer
*Assistant Examiner*—Bernard Lipman
*Attorney, Agent, or Firm*—George D. Morris

[57] ABSTRACT

Butadiene polymer dissolved in solvent is reacted with chlorine, bromine or a mixture thereof in the presence of aluminum-containing material to produce halogenated butadiene polymer. The presence of the aluminum-containing material reduces crosslinking of the halogenated butadiene polymer product. Exemplary aluminum-containing materials are trialkyl aluminum, dialkyl aluminum halide, alkyl aluminum dihalide, alkyl aluminum sesquihalide, aluminum trihalide and their mixtures. The preferred butadiene polymer starting material is polybutadiene having at least about 90 mole percent cis-1,4-configuration.

52 Claims, No Drawings

PROCESS FOR HALOGENATION OF BUTADIENE POLYMER IN THE PRESENCE OF ALUMINUM-CONTAINING MATERIAL

The halogenation of butadiene polymer is usually accomplished by reacting the butadiene polymer, dissolved in a solvent system, with chlorine, bromine, or a mixture thereof. A problem often encountered in such chlorination reactions, however, is that the halogenated butadiene polymer product is unduly crosslinked.

The present invention serves to alleviate the above problem by permitting the formation of halogenated butadiene polymer having a lesser degree of crosslinking. Accordingly, in a process for producing halogenated butadiene polymer wherein butadiene polymer dissolved in solvent is reacted with chlorine, bromine or a mixture thereof under conditions that would lead to crosslinking of the halogenated butadiene polymer, the invention is the improvement comprising conducting at least a portion of the reaction in the presence of a crosslinking-reducing amount of aluminum-containing material comprising trialkyl aluminum, dialkyl aluminum halide, alkyl aluminum dihalide, alkyl aluminum sesquihalide, aluminum trihalide or a mixture thereof, to substantially reduce the crosslinking.

The names of the aluminum containing materials set forth above, are given in monomer form without regard to the actual degree of association. The degrees of association of materials of these types are discussed by Cotton and Wilkinson, *Advanced Inorganic Chemistry*, 3d edition, Interscience Publishers, a division of John Wiley & Sons, New York (1972), pages 264–265 and Coates, Green and Wade, *Organometallic Compounds*, 3d edition, volume 1, Methuen & Co. Ltd., London (1967), pages 299–305 and 337–339, the entire disclosures of which are incorporated herein by reference. It appears from these disclosures that many of the aluminum-containing materials are dimers, other monomers, while some may be monomers or dimers or monomers and dimers in equilibrium depending upon the conditions to which they are exposed.

Each alkyl group on those aluminum-containing materials having one or more of such groups, namely, trialkyl aluminum, dialkyl aluminum halide, alkyl aluminum dihalide and alkyl aluminum sesquihalide, ordinarily independently contains from 1 to about 4 carbon atoms. Typically each alkyl group independently contains 1 or 2 carbon atoms. Ethyl is preferred. Each alkyl group of 3 or more carbon atoms may independently be straight or branched. The alkyl groups on those aluminum-containing materials whose molecules have a plurality of such groups may be the same or different, but preferably they are the same.

Each halide group on those aluminum-containing materials having one or more of such groups, namely dialkyl aluminum halide, alkyl aluminum dihalide, alkyl aluminum sesquihalide and aluminum trihalide, is ordinarily independently a chloride group or a bromide group. Chloride is preferred. The halide groups on those aluminum-containing materials whose molecules have a plurality of such groups may be the same or different, but preferably they are the same. The preferred aluminum-containing materials having at least one halide group are dialkyl aluminum chloride, alkyl aluminum dichloride, alkyl aluminum sesquichloride, aluminum trichloride or a mixture thereof. When the aluminum-containing material comprises aluminum trihalide, aluminum trichloride and/or aluminum tribromide are preferred; aluminum trichloride is the particularly preferred compound of the aluminum trihalide subclass.

The preferred aluminum-containing material comprises trialkyl aluminum. Triethyl aluminum is especially preferred.

Only one aluminum-containing material or a plurality of aluminum-containing materials may be used as desired.

The solvent may be a single solvent or it may be a mixture of solvents. The solvent is generally substantially inert under the conditions of the reaction, but if it does react, the reaction and the reaction products should not be such as to seriously interfere with the halogenation of the butadiene polymer. The halogenated butadiene polymer product may remain dissolved in the solvent at the conclusion of the halogenation reaction or a portion or even substantially all of the product may precipitate during the reaction.

Examples of suitable solvents include perhalogenated alkanes having 1 to about 2 carbon atoms, partially halogenated alkanes having 1 to about 2 carbon atoms and halogenated unsubstituted or substituted benzenes having 1 to about 2 halogen atoms. Among the solvents which may be used are carbon tetrachloride, trichlorofluoromethane, dichlorofluoromethane, chlorotrifluoromethane, bromotrifluoromethane, 1,1,2-trichloro-1,2,2-trifluoroethane, 1,2-dichloro-1,1,2,2-tetrafluoroethane, methyl chloride, methylene chloride, chloroform, methyl bromide, chlorodifluoromethane, ethyl chloride, ethylene dichloride, chlorobenzene, 1,2-dichlorobenzene, 1,3-dichlorobenzene, 1-chlorotoluene, 2-chlorotoluene, 3-chlorotoluene and miscible mixtures thereof. The preferred solvent comprises carbon tetrachloride and methylene chloride, especially at a volumetric ratio of about 4:1.

The butadiene polymer starting material is itself known. It may be a homopolymer of butadiene, or it may be an interpolymer, block polymer or graft polymer based on butadiene and one or more other monomers or polymers. In the case of interpolymers, block polymers and graft polymers, it is preferred that they be based in major molar amount on butadiene. Mixtures of butadiene polymers may be used where desired. The weight average molecular weight of the butadiene polymer is subject to wide variation, but it is usually in the range of from about 25,000 to about 1,000,000. Often the weight average molecular weight is in the range of from about 40,000 to about 800,000. It is preferred that the weight average molecular weight be in the range of from about 200,000 to about 500,000.

The preferred butadiene polymer starting material is polybutadiene which has at least about 90 mole percent cis-1,4-configuration. Often such high cis polybutadien has at least about 95 mole percent cis-1,4-configuration, and sometimes it has at least about 99 mole percent cis-1,4-configuration.

The initial concentration of the butadiene polymer dissolved in the solvent solution may be varied considerably. While the numerical value employed will depend in part upon the identities of the butadiene polymer and the solvent, usually the initial concentration of butadiene polymer in the solution is in the range from about 0.1 to about 10 weight percent. Typically the concentration is in the range of from about 0.5 to about 5 weight percent. From about 1 to about 3 weight percent is preferred.

The reaction is conducted in the liquid phase, either with or without boiling of the solvent at the prevailing pressure employed. In general, as the temperature is increased from a low value, the degree of halogenation by substitution of halogen for hydrogen in the butadiene polymer increases. For example, at temperatures on the order of 0° C., the halogenation of high-cis polybutadiene is mostly all by addition to the double bonds. At temperatures above about 56° C., halogenation by substitution becomes significant. At still higher temperatures the degree of halogenation by substitution becomes greater. While the temperature may be widely varied depending upon the degree and type of halogenation desired, it is generally in the range of from about $-10°$ C. to about $+150°$ C. Temperatures in the range of from about 0° C. to about 85° C. are typical. In one embodiment of the invention the temperatures are in the range of from about 0° C. to about 25° C. In another embodiment of the invention the temperatures are in the range of from about 20° C. to about 60° C. with the maximum temperature reached during the reaction being in the range of from about 45° C. to about 60° C. It is preferred that the reaction be conducted using temperatures in the range of from about 20° C. to about 56° C. with the maximum temperature reached during the reaction being in the range of from about 45° C. to about 56° C.

The pressure employed is susceptible to wide variation. Subatmospheric pressures may be, but are only rarely used. Ordinarily, atmospheric or superatmospheric pressures are utilized. Typically, the pressure is in the range of from about 0 to about 500 pounds per square inch gauge. Pressures in the range of from about 0 to about 100 pounds per square inch gauge are frequently used. Preferred pressures are in the range of from about 0 to about 50 pounds per square inch gauge.

The amount of aluminum-containing material used is dependent upon many factors. Included among these are the identities and amounts of the butadiene polymer, the solvent, the aluminum-containing material and impurities in the system. Other factors include the conditions under which the reaction is conducted.

Although it is not desired to be bound by any theory it is believed that the amounts and identities of impurities, particularly those present in the butadiene polymer starting material, are factors of primary concern in establishing the amount of aluminum-containing material to be used. It may be that the impurities are antioxidants employed by commercial manufacturers of butadiene polymers. The basis for these beliefs will be developed in the examples.

Irrespective of the correctness of the theory, it has been found that the presence of some aluminum-containing material often reduces crosslinking of the halogenated butadiene polymer product, but that too much aluminum-containing material can induce such crosslinking. The appropriate amount of aluminum-containing material for any particular reaction system may easily be ascertained by a simple series of tests where the butadiene polymer is halogenated, usually at laboratory scale, using varying amounts of the aluminum-containing material and ascertaining the solubility index of the product. The solubility index is the percent of light transmitted by a one weight percent solution of the polymer in cyclohexanone relative to the light transmitted by pure cyclohexanone. A polymer solution having the same light transmission as pure cyclohexanone would therefore have a solubility index of 100. A Perkin Elmer Model 554 spectrophotometer using one centimeter cells and light with a wavelength of 600 nanometers is used in making these measurements. The solubility index is a measure of crosslinking; low values indicate crosslinking of the product, whereas high values are indicative of low degrees of crosslinking.

While the weight ratio of aluminum-containing material to butadiene polymer introduced to the reaction is believed to depend upon many factors as described above, typically it is in the range of from about 0.001:1 to about 0.02:1. Often it is in the range of from about 0.005:1 to about 0.015:1. Preferably, the weight ratio is in the range of from about 0.007:1 to about 0.01:1.

The reaction maybe conducted continuously, semicontinuously or batchwise.

After a small proportion of the halogenating agent has been added, a precipitate, usually in the form of small black particles, sometimes forms. In such cases, it is generally advantageous to interrupt the halogenation and remove the precipitate, typically by filtration or centrifugation, before resuming the halogenation. When no such precipitate is formed, it is not ordinarily necessary to interrupt the halogenation.

When the reaction has been completed, or in some cases even while it is underway, the halogenated butadiene polymer product may be recovered from the reaction mixture. This may be accomplished in many different ways. One of these is to evaporate the liquid from the polymer. Precipitative extraction is another recovery method which can be used when the product polymer is dissolved in the liquid. In precipitative extraction, the reaction mixture is combined with a liquid diluent in which the solvent is soluble but the polymer relatively insoluble, to precipitate the polymer which is then separated from the liquid phase by filtration of centrifugation. As an example, when the solvent of the reaction mixture is carbon tetrachloride, the reaction mixture may be combined with methanol to precipitate the polymer. In another recovery method, which is applicable when the product polymer precipitates as fine particles during the halogenation reaction, the product polymer may be recovered from the reaction mixture by filtration or centrifugation. In any of these cases, the residual liquid may be removed from the product by any of several procedures, including drying, washing followed by drying and steam distillation followed by drying.

The solvent may also be recovered, usually for recycling to the halogenation process. In those instances where the product polymer has precipitated during the halogenation reaction and has been recovered from the reaction mixture by filtration or centrifugation, the filtrate may be recycled to the halogenation process. In order to preclude the accumulation of nonvolatile impurities, all or a portion of the filtrate may be distilled before recycling. A simple one-plate distillation is usually satisfactory for this purpose. In those instances where the product polymer has been recovered by precipitation using a liquid diluent, both the solvent and the liquid diluent may be recovered by fractional distillation. In order to preclude the accumulation of nonvolatile impurities, all or a portion of the bottoms from the fractionating column may be distilled in a simple one plate distillation. Alternatively, the bottoms from the fractionating column may be removed as a vapor rather than as a liquid so that the non-volatile materials remain in the reboiler. The vapor is then condensed. The impurities may be purged from the reboiler as desired. The recovered solvent and recovered liquid diluent are advantageously recycled to their respective points of introduction to the process.

When the impurities that tend to accumulate in the system are water soluble, the liquid from which the product polymer is separated may be washed with water or dilute caustic solution. This is especially beneficial in those instances where the product polymer precipitates during halogenation and no diluent is added. In such cases the organic and aqueous phases are separated prior to recycling the solvent to the process. Ordinarily the organic phase is not dried, although it may be dried when desired. A water or dilute caustic wash may be used either in lieu of or in conjunction with distillation of the organic liquid, depending upon the nature of the impurities involved.

A water or dilute caustic wash may also be used when the polymer is precipitated through use of a diluent although the separation of solvent, diluent and water may require a rather sophisticated separation system. In the case where the solvent and the diluent are separated by fractional distillation and the liquid bottoms from column is substantially insoluble in water, the bottoms may be washed with water or dilute aqueous caustic solution and the organic layer recovered by phase separation.

In any system involving recycle of solvent and/or diluent, appropriate amounts of either or both of these materials may be introduced as makeups as needed.

Although the invention in its broadest aspects may be used to produce halogenated butadiene polymers having considerable crosslinking, it is preferred that it be employed to produce substantially thermoplastic halogenated butadiene polymers. Such thermoplastic halogenated polymers have solubility indices of at least about 50. The solubility index is often at least about 80 and preferably it is at least about 90. The substantially thermoplastic halogenated butadiene polymers are soluble in such solvents as benzene, acetone and dioxane.

While the butadiene polymer may be halogenated using chlorine, bromine or a mixture of chlorine and bromine, chlorine is the preferred halogenating agent.

According to a preferred embodiment, in a process for producing chlorinated butadiene polymer wherein the butadiene polymer dissolved in solvent is reacted with chlorine under conditions that would lead to crosslinking of the chlorinated butadiene polymer, the improvement comprises conducting at least a portion of the reaction in the presence of a crosslinking-reducing amount of aluminum-containing material comprising trialkyl aluminum, dialkyl aluminum chloride, alkyl aluminum dichloride, alkyl aluminum sesquichloride, aluminum trichloride or a mixture thereof, to substantially reduce the crosslinking.

There are many utilities for halogenated butadiene polymers, especially when they are substantially thermoplastic. When dissolved in suitable solvents they may be cast into various shapes such as films and sheets or they may be used in coating compositions. They may be molded, extruded or otherwise shaped into substantially any shape. They may be compounded with pigments, plasticizers, other polymers and additives customarily employed in the plastics industry. Halogenated butadiene polymers, for example, may be used for electrical cable coverings. When containing residual unsaturation they may be crosslinked, usually in the presence of initiator which provides free radicals; crosslinking monomers or oligomers may be present or absent as desired.

The listing of optional ingredients discussed above is by no means exhaustive. Other ingredients may be used in their customary amounts for their customary purposes so long as they do not seriously interfere with good fabrication or coatings practice.

In the illustrative examples which follow, all parts are parts by weight and percentages are percent by weight unless otherwise specified. Control examples are denoted by Roman letters; examples employing aluminum-containing material are identified with Arabic numerals.

EXAMPLE A

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having 98 mole percent cis-1,4-configuration was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 26° C. and the addition of chlorine through the gas feed tube at a rate of 2.067 grams per minute was begun. Twenty-nine minutes and 44 seconds later the temperature was 52° C., which was the maximum temperature reached during the reaction. After a further 11 minutes and 19 seconds, the temperature was 49° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, weighed 117.0 grams, contained 57.57 percent by weight chlorine and had a solubility index of 31.6.

EXAMPLE B

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having 98 mole percent cis-1,4-configuration was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 27° C. and the addition of chlorine through the gas feed tube at a rate of 2.067 grams per minute was begun. Forty-two minutes and 40 seconds later the temperature was 53° C., which was the maximum temperature reached during the reaction. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, contained 58.9 percent by weight chlorine and had a solubility index of 32.4 and 31.6, as observed in two determinations.

EXAMPLE 1

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having 98 mole percent cis-1,4-configuration was added in small pieces and dissolved in the solvent. To the polymer solution was added 1.68 grams of a 25 percent by weight solution of triethyl aluminum in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 28° C. and the addition of chlorine through the gas feed tube at a rate of 2.067 grams per minute was begun. Twenty-nine minutes and 50 seconds later the temperature was 53° C. which was the maximum temperature reached during the reaction. After a further 4 minutes and 42 seconds, the temperature was 51° C. At this time the addition of chlorine was terminated and nitrogen was introduced through the gas feed tube for several hours as a purge. The reacton mixture was filtered to separate the fine particulate precipitate persent in the reaction mixture from the bulk of the liquid phase. The wet filter cake was broken up and dried on the filter by drawing air at room temperature through the solids and the filter. The product, chlorinated polybutadiene, contained 57.32 percent by weight chlorine and had a solubility index of 93.6.

The solubility index of this example, when compared with those of Examples A and B, shows that the presence of triethyl aluminum resulted in chlorinated polybutadiene having substantially less crosslinking.

EXAMPLE 2

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having 98 mole percent cis-1,4-configuration was added in small pieces and dissolved in the solvent. To the polymer solution was added 2 milliliters of a 25 percent by weight solution of triethyl aluminum in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 23° C. and the addition of chlorine through the gas feed tube at a rate of 2.067 grams per minute was begun. Thirty minutes and 55 seconds later the temperature was 50° C. which was the maximum temperature reached during the reaction. After a further 11 minutes and 24 seconds, the temperature was 47° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, contained 58.2 percent by weight chlorine and had a solubility index of 86.4 and 88.0 as observed in two determinations.

The solubility index of this example, when compared with those of Examples A and B, shows that the presence of triethyl aluminum resulted in chlorinated polybutadiene having substantially less crosslinking.

EXAMPLE 3

A 3 liter, 4-necked flask equipped with an agitator was charged with 2500 milliliters of solvent consisting essentially of 20 volumetric parts of methylene chloride and 80 volumetric parts of carbon tetrachloride. Fifty-five grams of commercial polybutadiene having a weight average molecular weight in the range of from 300,000 to 500,000 and having 98 mole percent cis-1,4configuration was added in small pieces and dissolved in the solvent. To the polymer solution was added 1.5 milliliters of a 25 percent by weight solution of triethyl aluminum in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 26° C. and the addition of chlorine through the gas feed tube at a rate of 2.067 grams per minute was begun. Thirty-three minutes and 29 seconds later the temperature was 53° C. which was the maximum temperature reached during the reaction. After a further 11 minutes and 42 seconds, the temperature was 50° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, contained 57.3 percent by weight chlorine and had a solubility index of 94.4.

The solubility index of this example, when compared with those of Examples A and B, shows that the presence of triethyl aluminum resulted in chlorinated polybutadiene having substantially less crosslinking.

EXAMPLE 4

A 3 liter, 4-necked flask equipped with an agitator was charged with 2500 milliliters of solvent consisting essentially of 20 volumetric parts of methylene chloride and 80 volumetric parts of carbon tetrachloride. Fifty-five grams of commercial polybutadiene having a weight average molecular weight in the range of from 300,000 to 500,000 and having 98 mole percent cis-1,4-configuration was added in small pieces and dissolved in the solvent. To the polymer solution was added 3 milliliters of a 25 percent by weight solution of triethyl aluminum in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 25° C. and the addition of chlorine through the gas feed tube at a rate of 2.067 grams per minute was begun. Eleven minutes and 40 seconds later the temperature was 35° C. and the color of the reaction mixture was violet. After a further 27 minutes and 7 seconds the temperature was 50° C., the maximum temperature reached during the reaction, and the reaction mixture was viscous. After yet a further 12 minutes and 32 seconds, the temperature was 49° C. and the color of the reaction mixture had become yellow. At this time the addition of chlorine was terminated and nitrogen was introduced through the gas feed tube for several hours as a purge. The reaction mixture was filtered with some difficulty to separate the particulate precipitate present in the reaction mixture from the bulk of the liquid phase. The wet filter cake was broken up and dried on the filter by drawing air at room temperature through the solids and the filter. The product, chlorinated polybutadiene, contained 58.1 percent by weight chlorine and had a solubility index of 28.

The solubility index of this example, when compared with those of Examples A and B and those of Examples 1–3, shows that the presence of an excessive amount of triethyl aluminum resulted in chlorinated polybutadiene having as much or more crosslinking than the controls.

EXAMPLE 5

A 3 liter, 4-necked flask equipped with an agitator was charged with 2500 milliliters of solvent consisting essentially of 20 volumetric parts of methylene chloride and 80 volumetric parts of carbon tetrachloride. Fifty-five grams of commercial polybutadiene having a weight average molecular weight in the range of from 300,000 to 500,000 and having 98 mole percent cis-1,4-configuration was added in small pieces and dissolved in the solvent. To the polymer solution was added 1.5 milliliters of a 25 percent by weight solution of diethyl aluminum chloride in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 27° C. and the addition of chlorine through the gas feed tube at a rate of 2.067 grams per minute was begun. Thrity-three minutes and 58 seconds later the temperature was 54° C. which was the maximum temperature reached during the reaction. After a further 7 minutes and 48 seconds, the temperature was 52° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, contained 53.7 percent by weight chlorine and had a solubility index of 96.1.

The solubility index of this example, when compared with those of Examples A and B, shows that the presence of diethyl aluminum chloride resulted in chlorinated polybutadiene having substantially less crosslinking.

EXAMPLE 6

A 3 liter, 4-necked flask equipped with an agitator was charged with 2500 milliliters of solvent consisting essentially of 20 volumetric parts of methylene chloride and 80 volumetric parts of carbon tetrachloride. Fifty-five grams of commercial polybutadiene having a weight average molecular weight in the range of from 300,000 to 500,000 and having 98 mole percent cis-1,4-configuration was added in small pieces and dissolved in the solvent. To the polymer solution was added 1.5 milliliters of a 25 percent by weight solution of ethyl aluminum sesquichloride in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 27° C. and the addition of chlorine through the gas feed tube at a rate of 2.067 grams per minute was begun. Thirty-five minutes and 37 seconds later the temperature was 54° C., which was the maximum temperature reached during the reaction. After a further 7 minutes and 43 seconds the temperature was 52° C. After yet a further 78 seconds, the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, contained 56.6 percent by weight chlorine and had a solubility index of 98.2.

The solubility index of this example, when compared with those of Examples A and B, shows that the presence of ethyl aluminum sesquichloride resulted in chlorinated polybutadiene having substantially less crosslinking.

EXAMPLE 7

A 3 liter, 4-necked flask equipped with an agitator was charged with 2500 milliliters of solvent consisting essentially of 20 volumetric parts of methylene chloride and 80 volumetric parts of carbon tetrachloride. Fifty-five grams of commercial polybutadiene having a weight average molecular weight in the range of from 300,000 to 500,000 and having 98 mole percent cis-1,4-configuration was added in small pieces and dissolved in the solvent. To the polymer solution was added 1.5 milliliters of a 25 percent by weight solution of ethyl aluminum dichloride in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 27° C. and the addition of chlorine through the gas feed tube at a rate of 2.067 grams per minute was begun. As soon as chlorine was added to the reaction mixture, small black particles were formed. Forty-two minutes and 20 seconds later the temperature was 53° C. which was the maximum temperature reached during the reaction. After a further 60 seconds, the temperature was 50° C. At this time the addition of chlorine was terminated and nitrogen was introduced through the gas feed tube for several hours as a purge. The reaction mixture was filtered to separate the fine particulate precipitate present in the reaction mixture, which precipitate included the small black particles, from the bulk of the liquid phase. The wet filter cake was broken up and dried on the filter by drawing air at room temperature through the solids and the filter. The product, chlorinated polybutadiene, contained 60.2 percent by weight chlorine and had a solubility index of 86.9.

The solubility index of this example, when compared with those of Examples A and B, shows that the presence of ethyl aluminum dichloride resulted in chlorinated polybutadiene having substantially less crosslinking.

EXAMPLE 8

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having 98 mole percent cis-1,4-configuration was added in small pieces and dissolved in the solvent. To the polymer solution was added 0.5 gram of aluminum trichloride. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 26° C. and the addition of chlorine through the gas feed tube at a rate of 2.067 grams per minute was begun. As soon as chlorine was added to the reaction mixture, small black particles were formed. Thirty-three minutes and 20 seconds later the temperature was 50° C., which was the maximum temperature reached during the reaction. After a further 5 minutes and 42 seconds, the temperature was 48° C. At this time the addition of chlorine was terminated and nitrogen was introduced through the gas feed tube for several hours as a purge. The reaction mixture was filtered to separate the fine particulate precipitate present in the reaction mixture, which precipitate included the small black particles, from the bulk of the liquid phase. The wet filter cake was broken up and dried on the filter by drawing air at room temperature through the solids and the filter. The product, chlorinated polybutadiene, contained 59.8 percent by weight chlorine and had a solubility index of 72.3.

The solubility index of this example, when compared with those of Examples A and B, shows that the presence of aluminum trichloride resulted in chlorinated polybutadiene having substantially less crosslinking.

EXAMPLE 9

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having 98 mole percent cis-1,4-configuration was added in small pieces and dissolved in the solvent. To the polymer solution was added 1.0 gram of aluminum trichloride. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 30° C. and the addition of chlorine through the gas feed tube at a rate of 2.067 grams per minute was begun. As soon as chlorine was added to the reaction mixture, small black particles were formed. Twenty-six minutes and 40 seconds later the temperature was 52° C. which was the maximum temperature reached during the reaction. After a further 11 minutes and 40 seconds, the temperature was 49° C. At this time the addition of chlorine was terminated and nitrogen was introduced through the gas feed tube for several hours as a purge. The reaction mixture was filtered to separate the fine particulate precipitate present in the reaction mixture, which precipitate included the small black particles, from the bulk of the liquid phase. The wet filter cake was broken up and dried on the filter by drawing air at room temperature through the solids and the filter. The product, chlorinated polybutadiene, contained 46.27 percent by weight chlorine and had a solubility index of 92.8.

The solubility index of this example, when compared with those of Examples A and B, shows that the presence of aluminum trichloride resulted in chlorinated polybutadiene having substantially less crosslinking.

EXAMPLE C

According to the literature, at the end of the commercial polymerization of butadiene, an antioxidant such as N-phenyl-beta-naphthylamine is added to the product. Also according to the literature, N-phenyl-beta-naphthylamine also accelerates the vulcanizing of polybutadiene. In order to ascertain whether one or more impurities in the polybutadiene may be responsible for inducing crosslinking during chlorination of polybutadiene, it was decided to purify a sample of commercial polybutadiene prior to chlorination. Since all the amines commonly used as antioxidants are soluble in toluene the polybutadiene was dissolved in toluene and precipitated with methanol as set forth below. Nitrogen analysis of the starting polybutadiene showed it to contain 44 parts of nitrogen per million parts of sample, by weight.

One hundred fifty grams of commercial polybutadiene having a weight average molecular weight of about 400,000 and having about 98 mole percent cis-1,4-configuration was dissolved, under nitrogen, in 2000 milliliters of toluene. The solution was admixed with 2000 milliliters of methanol to form a first precipitate which was recovered by filtration. The precipitate was then dissolved, under nitrogen, in 2000 milliliters of toluene. The solution was admixed with 2000 milliliters of methanol to form a second precipitate which was recovered by filtration and dried at room temperature in a vacuum over at an absolute pressure of about 2 inches of mercury for about 4 days. The product was purified polybutadiene. Nitrogen analysis of the purified polybutadiene showed no detectable nitrogen; therefore the nitrogen content was less than 10 parts nitrogen per million parts of sample, by weight.

A 3 liter, 4-necked flask equipped with an agitator and a gas feed tube was charged with 1500 cubic centimeters of solvent consisting essentially of 20 volumetric parts of methylene chloride and 80 volumetric parts of carbon tetrachloride. Thirty grams of the above purified polybutadiene was added to the flask and dissolved in the solvent under nitrogen. The flask was then equipped with a thermometer and an acetone-solid carbon dioxide cooled reflux condenser. The solution was purged with nitrogen introduced through the gas feed tube. The nitrogen purge was discontinued. The temperature of the solution was 28° C. and the addition of chlorine through the gas feed tube at a rate of 2.067 grams per minute was begun. After the addition had progressed for 26 minutes and 18 seconds, the temperature of the reaction mixture was 57° C., the maximum temperature reached during the reaction, and reflux was observed. After a further 6 minutes and 40 seconds the addition of chlorine was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up, washed with water and dried in air for 5 days. The product, chlorinated polybutadiene, contained 57.3 percent by weight chlorine and had a solubility index of 93.0.

The solubility index of this example, when compared with those of Examples A and B and those of Examples 1-8, suggests that one or more impurities in the polybutadiene may be responsible for inducing crosslinking during the chlorination of polybutadiene. The comparison also shows that the present invention may be used to obtain chlorinated polybutadiene from commercial polybutadiene containing impurities without resorting to rather cumbersome purification techniques.

EXAMPLE D

A 2-liter, 4-necked flask equipped with an agitator was charged with 1500 cubic centimeters of carbon tetrachloride. Twenty-five grams of commercial polybutadiene having a weight average molecular weight in the range of from 300,000 to 500,000 and having 98 mole percent cis-1,4-configuration was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 25° C. and the addition of chlorine through the gas feed tube at a rate of 3.45 grams per minute was begun. Six minutes and 40 seconds later the temperature was 46° C., and a precipitate was noticeable. After a further 3 minutes and 20 seconds the temperature was 52° C., which was the maximum temperature reached during the reaction. After yet a further 6 minutes and 40 seconds, the temperature was 50.5° C. and a small chlorine reflux was observed. After an additional 4 minutes and 5 seconds the temperature was 49° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The precipitate was slurried in methanol and filtered. The wet filter cake was broken up and dried on the filter by drawing air at room temperature through the solids and the filter. The product, chlorinated polybutadiene, contained 52.1 percent by weight chlorine and had a solubility index of 4.7.

EXAMPLE E

A 2 liter, 4-necked flask equipped with an agitator was charged with 1500 cubic centimeters of carbon tetrachloride. Twenty-five grams of commercial polybutadiene having a weight average molecular weight in the range of from 300,000 to 500,000 and having 98 mole percent cis-1,4-configuration was added in small pieces and dissolved in the solvent. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 26° C. and the addition of chlorine through the gas feed tube at a rate of 4.884 grams per minute was begun. Five minutes later the temperature was 47° C. and a white slurry was observed. After a further 100 seconds the temperature was 53° C., the maximum temperature reached during the reaction, and a light yellow slurry was observed. After yet a further 5 minutes and 44 seconds, the temperature was 52° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The precipitate was washed with methanol. The wet filter cake was broken up and dried on the filter by drawing air at room temperature through the solids and the filter. The product, chlorinated polybutadiene, contained 52.1 percent by weight chlorine and had a solubility index of 4.1.

EXAMPLE 10

A 3 liter, 4-necked flask equipped with an agitator was charged with 2500 milliliters of carbon tetrachloride. Fifty-five grams of commercial polybutadiene having a weight average molecular weight in the range of from 300,000 to 500,000 and having 98 mole percent cis-1,4-configuration was added in small pieces and dissolved in the solvent. To the polymer solution was added 2 milliliters of a 25 percent by weight solution of triethyl aluminum in toluene. The flask was then equipped with a gas feed tube, a thermometer and an acetone-solid carbon dioxide cooled reflux condenser. The solution was purged with nitrogen introduced through the gas feed tube. The nitrogen purge was then terminated. The temperature of the solution was 28° C. and the addition of chlorine through the gas feed tube at a rate of 2.067 grams per minute was begun. Forty minutes and 14 seconds later the temperature was 55° C., which was the maximum temperature reached during the reaction. After a further 9 minutes and 59 seconds, the temperature was 50° C. At this time the addition of chlorine was terminated and nitrogen was introduced through the gas feed tube for several hours as a purge. The reaction mixture was filtered to separate the fine particulate precipitate present in the reaction mixture from the bulk of the liquid phase. The wet filter cake was broken up and dried on the filter by drawing air at room temperature through the solids and the filter. The product, chlorinated polybutadiene, contained 58.2, 60.4 percent by weight chlorine as observed in two determinations and had a solubility index of 49.8.

The solubility index of this example, when compared with those of Examples D and E, shows that the presence of triethyl aluminum resulted in chlorinated polybutadiene having substantially less crosslinking.

EXAMPLE 11

A 3 liter, 4-necked flask equipped with an agitator was charged with 2500 milliliters of carbon tetrachloride. Fifty-five grams of commercial polybutadiene having a weight average molecular weight in the range of from 300,000 to 500,000 and having 98 mole percent cis-1,4-configuration was added in small pieces and dissolved in the solvent. To the polymer solution was added 4 milliliters of a 25 percent by weight solution of triethyl aluminum in toluene. The flask was then equipped with a gas feed tube, a thermometer and an acetone-solid carbon dioxide cooled reflux condenser.

The solution was purged with nitrogen introduced through the gas feed tube. The nitrogen purge was then terminated. The temperature of the solution was 29° C. and the addition of chlorine through the gas feed tube at a rate of 2.067 grams per minute was begun. Seven minutes and 32 seconds later the temperature was 37° C. and the reaction mixture was purple in color. After a further 2 minutes and 57 seconds the temperature was 42° C. and the color had become a dark purple. After yet a further 9 minutes and 31 seconds, the temperature was 53° C., the maximum temperature reached during the reaction, and the reaction mixture had gelled. At this time, the reaction was terminated.

The results of this example, when compared with those of Examples D and E and those of Example 10 suggests that the presence of an excessive amount of triethyl aluminum promotes gellation and coloration.

EXAMPLE F

A 3 liter, 4-necked flask equipped with an agitator was charged with 1750 cubic centimeters of methylene chloride and 750 cubic centimeters of 1,1,2-trichloro-1,2,2-trifluoroethane. Fifty grams of commercial polybutadiene having a weight average molecular weight in the range of from 480,000 to 490,000 and having 98 mole percent cis-1,4-configuration was added in small pieces and dissolved in the solvent. The flask was then equipped with a gas feed tube, a thermometer and an acetone solid carbon dioxide cooled reflux condenser. The solution was purged with nitrogen introduced through the gas feed tube. The nitrogen purge was discontinued. The temperature of the solution was 24° C. and the addition of chlorine through the gas feed tube at a rate of 2.067 grams per minute was begun. After the addition had progressed for 20 minutes and 33 seconds the temperature of the reaction mixture was 37° C., the maximum temperature reached during the reaction, and reflux was observed. After a further 14 minutes and 27 seconds the addition of chlorine was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up and dried on the filter by drawing air at room temperature through the solids and the filter. The product, chlorinated polybutadiene, contained 54.3 percent by weight chlorine and had a solubility index of 64.2.

EXAMPLE G

A 3 liter, 4-necked flask equipped with an agitator was charged with 1750 cubic centimeters of methylene chloride and 750 cubic centimeters of 1,1,2-trichloro-1,2,2-trifluoroethane. Fifty-five grams of commercial polybutadiene having a weight average molecular weight in the range of from 480,000 to 490,000 and having 98 mole percent cis-1,4-configuration was added in small pieces and dissolved in the solvent. The flask was then equipped with a gas feed tube, a thermometer and an acetone solid carbon dioxide cooled reflux condenser. The solution was purged with nitrogen introduced through the gas feed tube. The nitrogen purge was discontinued. The temperature of the solution was 24° C. and the addition of chlorine through the gas feed tube at a rate of 2.067 grams per minute was begun. After the addition had progressed for 30 minutes and 14 seconds the temperature of the reaction mixture was 36.5° C., which was the maximum temperature reached during the reaction. After a further 3 minutes and 15 seconds the addition of chlorine was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up and dried on the filter by drawing air at room temperature through the solids and the filter. The product, chlorinated polybutadiene, contained 53.0 percent by weight chlorine and had a solubility index of 54.7.

EXAMPLE 12

A 3 liter, 4-necked flask equipped with an agitatr was charged with 1750 cubic centimeters of methylene chloride and 750 cubic centimeters of 1,1,2-trichloro-1,2,2-trifluoroethane. Fifty-five grams of commercial polybutadiene having a weight average molecular weight in the range of from 480,000 to 490,000 and having 98 mole percent cis-1,4-configuration was added in small pieces and dissolved in the solvent. To the polymer solution was added 1.5 milliliters of a 25 percent by weight solution of triethyl aluminum in toluene. The flask was then equipped with a gas feed tube, a thermometer and an acetone-solid carbon dioxide cooled reflux condenser. The solution was purged with nitrogen introduced through the gas feed tube. The nitrogen purge was discontinued. The temperature of the solution was 25.5° C. and the addition of chlorine through the gas feed tube at a rate of 2.067 grams per minute was begun. After the addition had progressed for 14 minutes and 16 seconds the temperature of the reaction mixture was 37° C., the maximum temperature reached during the reaction, and reflux was observed. After a further 22 minutes and 8 seconds the addition of chlorine was terminated. Nitrogen was introduced through the gas feed tube for several hours as a purge. The addition of approximately 300 milliliters of 1,1,2-trichloro-1,2,2-trifluoroethane did not produce a definite separation of product and solvent. However, the addition of about 400 milliliters of methanol did cause precipitate to settle to the bottom of the flask. The mixture was filtered to separate the precipitate from the bulk of the liquid phase. The wet filter cake was broken up and dried on the filter by drawing air at room temperature through the solids and the filter. The product, chlorinated polybutadiene, contained 55.6 percent by weight chlorine and had a solubility index of 94.4.

The solubility index of this example, when compared with those of Examples F and G, shows that the presence of triethyl aluminum resulted in chlorinated polybutadiene having substantially less crosslinking.

Examples A, B, 1–9 and C were conducted using temperatures in the range of from about 23° C. to about 57° C. with maximum temperatures lying in the range of from about 50° C. to about 57° C. In the following examples, temperatures in the range of from about −0.5° C. to about +24° C. were employed.

EXAMPLE H

A 3 liter, 4-necked flask equipped with an agitator was charged with 2500 milliliters of solvent consisting essentially of 20 volumetric parts of methylene chloride and 80 volumetric parts of carbon tetrachloride. Forty-five grams of commercial polybutadiene having a weight average molecular weight in the range of from 300,000 to 500,000 and having about 98 mole percent cis-1,4-configuration was added in small pieces and dissolved in the solvent. The flask was then equipped with a gas feed tube, a thermometer and an acetone-solid carbon dioxide cooled reflux condenser. An ice-sodium chloride-water bath was brought up to the flask and the solution was purged with nitrogen introduced through the gas feed tube. The nitrogen purge was then discontinued. The temperature of the solution was 5° C. and the addition of chlorine through the gas feed tube at a rate of 2.067 grams per minute was begun. After the addition of chlorine had progressed 39 minutes, the temperature of the reaction mixture was 23° C., the maximum temperature reached during the reaction, and the addition was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up, washed four times with water and dried on the filter by drawing air at room temperature through the solids and the filter. The product, chlorinated polybutadiene, contained 57.58 percent by weight chlorine and had a solubility index of 86.5.

EXAMPLE I

A 3 liter, 4-necked flask equipped with an agitator was charged with 2500 cubic centimeters of solvent consisting essentially of 20 volumetric parts of methylene chloride and 80 volumetric parts of carbon tetrachloride. Seventy grams of commercial polybutadiene having a weight average molecular weight in the range of from 200,000 to 300,000 and having about 98 mole percent cis-1,4-configuration was added in small pieces and dissolved in the solvent. The flask was then equipped with a gas feed tube, a thermometer and an acetone-solid carbon dioxide cooled reflux condenser. An ice-sodium chloride-water bath was brought up to the flask and the solution was purged with nitrogen introduced through the gas feed tube. The nitrogen purge was then discontinued. The temperature of the solution was −0.5° C. and the addition of chlorine through the gas feed tube at a rate of 3.45 grams per minute was begun. After the addition of chlorine had progressed 23 minutes and 40 seconds, the temperature of the reaction mixture was 24° C., which was the maximum temperature reached during the reaction. After a further 5 minutes and 3 seconds the temperature was 23° C. and the addition was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up and dried on the filter by drawing air at room temperature through the solids and the filter. The product, chlorinated polybutadiene, weighed 148.50 grams, contained 54.6 percent by weight chlorine and had a solubility index of 96.4.

EXAMPLE 13

A 3 liter, 4-necked flask equipped with an agitator was charged with 2500 milliliters of solvent consisting essentially of 20 volumetric parts of methylene chloride and 80 volumetric parts of carbon tetrachloride. Fifty grams of commercial polybutadiene having a weight average molecular weight in the range of from 300,000 to 500,000 and having about 98 mole percent cis-1,4-configuration was added in small pieces and dissolved in the solvent. To the polymer solution was added 1.5 milliliters of a 25 percent by weight solution of triethyl aluminum in toluene. The flask was then equipped with a gas feed tube, a thermometer and an acetone-solid carbon dioxide cooled reflux condenser. An ice-sodium chloride-water bath was brought up to the flask and the solution was purged with nitrogen introduced through the gas feed tube. The nitrogen purge was then discontinued. The temperature of the solution was 8° C. and the addition of chlorine through the gas feed tube at a rate of 2.067 grams per minute was begun. After the addition of chlorine had progressed 29 minutes and 50 seconds, the temperature of the reaction mixture was 22° C., which was the maximum temperature reached during the reaction. After a further 10 minutes and 50 seconds the temperature was 18° C. and the addition was terminated. A precipitate of fine particles was present in the reaction mixture. Nitrogen was introduced through the gas feed tube for several hours as a purge. The reaction mixture was filtered to separate the precipitate from the bulk of the liquid phase. The wet filter cake was broken up and dried on the filter by drawing air at room temperature through the solids and the filter. The product, chlorinated polybutadiene, contained 57.22 percent by weight chlorine and had a solubility index of 92.9.

The solubility index of this example, when compared with those of Examples H and I indicates that the presence of triethyl aluminum may, in some instances, result in chlorinated polybutadiene having less crosslinking. This conclusion is reinforced by recognizing that the conditions under which Example 13 was run, were closer to those of Example H than to those of Example I. A comparison of the results of Examples H, I and 13 with those of Examples A, B, 1-9 and C, suggests that although a reduction in crosslinking of the product may be achieved at the lower temperatures of the former examples, the effect is more pronounced at the higher temperatures of the latter. This enhanced effect at the higher temperatures is especially advantageous, since cooling equipment may be omitted and the associated capital and operating expenditures saved.

Although the present invention has been described with reference to specific details of certain embodiments thereof, it is not intended that such details should be regarded as limitations upon the scope of the invention except insofar as they are included in the accompanying claims.

I claim:

1. In a process for producing halogenated butadiene polymer wherein butadiene polymer dissolved in solvent is reacted with chlorine, bromine or a mixture thereof under conditions that would lead to crosslinking of said halogenated butadiene polymer, the improvement comprising conducting at least a portion of said reaction in the presence of a crosslinking-reducing amount of aluminum-containing material comprising trialkyl aluminum, dialkyl aluminum halide, alkyl aluminum dihalide, alkyl aluminum sesquihalide, aluminum trihalide or a mixture thereof, to substantially reduce said crosslinking.

2. The process of claim 1 wherein said aluminum-containing material comprises trialkyl aluminum, dialkyl aluminum halide, alkyl aluminum dihalide, alkyl aluminum sesquihalide or a mixture thereof.

3. The process of claim 2 wherein each of said alkyl groups independently contains from 1 to about 4 carbon atoms.

4. The process of claim 2 wherein each of said alkyl groups independently contains 1 or 2 carbon atoms.

5. The process of claim 2 wherein each of said alkyl groups is ethyl.

6. The process of claim 1 wherein said aluminum-containing material comprises trialkyl aluminum.

7. The process of claim 6 wherein each of said alkyl groups independently contains from 1 to about 4 carbon atoms.

8. The process of claim 6 wherein each of said alkyl groups independently contains 1 or 2 carbon atoms.

9. The process of claim 1 wherein said aluminum-containing material comprises triethyl aluminum.

10. The process of claim 1 wherein said aluminum-containing material comprises dialkyl aluminum halide, alkyl aluminum dihalide, alkyl aluminum sesquihalide, aluminum trihalide or a mixture thereof.

11. The process of claim 10 wherein each of said halide groups is independently a chloride group or a bromide group.

12. The process of claim 10 wherein each of said halide groups is a chloride group.

13. The process of claim 1 wherein said butadiene polymer is polybutadiene.

14. The process of claim 13 wherein said polybutadiene has at least about 90 mole percent cis-1,4-configuration.

15. The process of claim 1 wherein said reaction is conducted at temperatures in the range of from about $-10°$ C. to about $+150°$ C.

16. The process of claim 1 wherein said reaction is conducted at temperatures in the range of from about $0°$ C. to about $85°$ C.

17. The process of claim 1 wherein said butadiene polymer dissolved in solvent is reacted with chlorine.

18. The process of claim 1 wherein said solvent comprises at least one perhalogenated alkane having 1 to about 2 carbon atoms.

19. The process of claim 1 wherein said solvent comprises carbon tetrachloride.

20. The process of claim 1 wherein said solvent consists essentially of carbon tetrachloride.

21. The process of claim 1 wherein said solvent comprises 1,1,2-trichloro-1,2,2-trifluoroethane.

22. The process of claim 1 wherein said solvent comprises at least one partially halogenated alkane having 1 to about 2 carbon atoms.

23. The process of claim 1 wherein said solvent comprises methylene chloride.

24. The process of claim 1 wherein said solvent comprises carbon tetrachloride and methylene chloride.

25. The process of claim 24 wherein the volumetric ratio of said carbon tetrachloride to said methylene chloride is about 4:1.

26. The process of claim 1 wherein the weight ratio of said aluminum-containing material to said butadiene polymer introduced to said reaction is in the range of from about 0.001:1 to about 0.02:1.

27. The process of claim 1 wherein the weight ratio of said aluminum-containing material to said butadiene polymer introduced to said reaction is in the range of from about 0.005:1 to about 0.015:1.

28. The process of claim 1 wherein the weight ratio of said aluminum-containing material to said butadiene polymer introduced to said reaction is in the range of from about 0.007:1 to about 0.01:1.

29. In a process for producing chlorinated butadiene polymer wherein butadiene polymer dissolved in solvent is reacted with chlorine under conditions that would lead to crosslinking of said chlorinated butadiene polymer, the improvement comprising conducting at least a portion of said reaction in the presence of a cross-linking-reducing amount of aluminum-containing material comprising trialkyl aluminum, dialkyl aluminum chloride, alkyl aluminum dichloride, alkyl aluminum sesquichloride, aluminum trichloride or a mixture thereof, to substantially reduce said crosslinking.

30. The process of claim 29 wherein said aluminum-containing material comprises trialkyl aluminum, dialkyl aluminum chloride, alkyl aluminum dichloride, alkyl aluminum sesquichloride, or a mixture thereof.

31. The process of claim 30 wherein each of said alkyl groups independently contains from 1 to about 4 carbon atoms.

32. The process of claim 30 wherein each of said alkyl groups independently contains 1 or 2 carbon atoms.

33. The process of claim 30 wherein each of said alkyl groups is ethyl.

34. The process of claim 29 wherein said aluminum-containing material comprises trialkyl aluminum.

35. The process of claim 34 wherein each of said alkyl groups independently contains from 1 to about 4 carbon atoms.

36. The process of claim 34 wherein each of said alkyl groups independently contains 1 or 2 carbon atoms.

37. The process of claim 29 wherein said aluminum-containing material comprises triethyl aluminum.

38. The process of claim 29 wherein said polybutadiene has at least about 90 mole percent cis-1,4-configuration.

39. The process of claim 29 wherein said reaction is conducted at temperatures in the range of from about $0°$ C. to about $25°$ C.

40. The process of claim 29 wherein said reaction is conducted at temperatures in the range of from about $20°$ C. to about $60°$ C. with the maximum temperature reached during the reaction being in the range of from about $45°$ C. to about $60°$ C.

41. The process of claim 29 wherein said reaction is conducted at temperatures in the range of from about $20°$ C. to about $56°$ C. with the maximum temperature reached during the reaction being in the range of from about $45°$ C. to about $56°$ C.

42. The process of claim 29 wherein said solvent comprises at least one perhalogenated alkane having 1 to about 2 carbon atoms.

43. The process of claim 29 wherein said solvent comprises carbon tetrachloride.

44. The process of claim 29 wherein said solvent consists essentially of carbon tetrachloride.

45. The process of claim 29 wherein said solvent comprises 1,1,2-trichloro-1,2,2-trifluoroethane.

46. The process of claim 29 wherein said solvent comprises at least one partially halogenated alkane having 1 to about 2 carbon atoms.

47. The process of claim 29 wherein said solvent comprises methylene chloride.

48. The process of claim 29 wherein said solvent comprises carbon tetrachloride and methylene chloride.

49. The process of claim 48 wherein the volumetric ratio of said carbon tetrachloride and said methylene chloride is about 4:1.

50. The process of claim 29 wherein the weight ratio of said aluminum-containing material to said butadiene polymer introduced to said reaction is in the range of from about 0.001:1 to about 0.02:1.

51. The process of claim 29 wherein the weight ratio of said aluminum-containing material to said butadiene polymer introduced to said reaction is in the range of from about 0.005:1 to about 0.015:1.

52. The process of claim 29 wherein the weight ratio of said aluminum-containing material to said butadiene polymer introduced to said reaction is in the range of from about 0.007:1 to about 0.01:1.

* * * * *